(12) United States Patent
Newhouse

(10) Patent No.: US 10,858,057 B2
(45) Date of Patent: Dec. 8, 2020

(54) HOVERBOARD BUDDY SYSTEM

(71) Applicant: David Newhouse, Wilmington, MA (US)

(72) Inventor: David Newhouse, Wilmington, MA (US)

( * ) Notice: Subject to any disclaimer, the term of this patent is extended or adjusted under 35 U.S.C. 154(b) by 0 days.

(21) Appl. No.: 15/642,329

(22) Filed: Jul. 5, 2017

(65) Prior Publication Data

US 2018/0141609 A1    May 24, 2018

Related U.S. Application Data

(60) Provisional application No. 62/331,971, filed on May 4, 2016, provisional application No. 62/465,152, filed on Feb. 28, 2017.

(51) Int. Cl.
| | | |
|---|---|---|
| *B62K 11/00* | (2006.01) | |
| *B62K 13/08* | (2006.01) | |
| *B62K 17/00* | (2006.01) | |
| *A63B 55/60* | (2015.01) | |
| *A61G 5/04* | (2013.01) | |
| *B62B 5/00* | (2006.01) | |

(52) U.S. Cl.
CPC .............. *B62K 13/08* (2013.01); *B62K 17/00* (2013.01); *A61G 5/047* (2013.01); *A63B 55/61* (2015.10); *A63B 2055/615* (2015.10); *B62B 5/0026* (2013.01); *B62K 11/007* (2016.11)

(58) Field of Classification Search
CPC ...... B62K 11/007; B62K 13/04; B62K 13/08; B62K 27/003
See application file for complete search history.

(56) References Cited

U.S. PATENT DOCUMENTS

| 5,762,154 | A | * | 6/1998 | Hsu | A61G 5/047 |
| | | | | | 180/15 |
| 6,139,032 | A | * | 10/2000 | Hartman | B62B 3/12 |
| | | | | | 280/32.7 |
| 7,635,037 | B2 | * | 12/2009 | Treadwell | B62B 5/005 |
| | | | | | 180/19.3 |
| 8,424,628 | B1 | * | 4/2013 | Schade | B62K 11/007 |
| | | | | | 180/273 |
| 8,825,254 | B2 | * | 9/2014 | Kobashi | B62K 3/007 |
| | | | | | 701/22 |
| 9,403,573 | B1 | * | 8/2016 | Mazzei | B62D 51/02 |
| 9,688,340 | B1 | * | 6/2017 | Kroymann | B62K 13/04 |
| 2002/0148657 | A1 | * | 10/2002 | Tyson | B62B 5/0026 |
| | | | | | 180/65.1 |
| 2004/0129464 | A1 | * | 7/2004 | Arling | B62D 51/008 |
| | | | | | 180/7.1 |
| 2007/0131461 | A1 | * | 6/2007 | Treadwell | B62B 5/005 |
| | | | | | 180/19.1 |

(Continued)

*Primary Examiner* — Hau V Phan
(74) *Attorney, Agent, or Firm* — Danielson Legal LLC

(57) ABSTRACT

The hoverboard buddy system utilizes a number of components that can be attached together with a hoverboard in a number of different configurations in order to expand the riding options of the user. In one embodiment, components include: a hoverboard, a saddle possibly with additional wheels and a stability bar, a plurality of straight handles, a plurality of curved handles, a plurality of accessory wheels, a split seat that independently actuates either foot pedal on a hoverboard, a fixed bench seat, pusher extension, and other components.

14 Claims, 8 Drawing Sheets

(56) References Cited

U.S. PATENT DOCUMENTS

| | | | | |
|---|---|---|---|---|
| 2010/0237645 A1* | 9/2010 | Trainer | ............... | G09F 15/0087 |
| | | | | 296/21 |
| 2011/0303475 A1* | 12/2011 | Kim | .................... | B62K 11/007 |
| | | | | 180/218 |
| 2011/0304121 A1* | 12/2011 | Chiu | ...................... | A61G 5/047 |
| | | | | 280/304.1 |
| 2013/0062857 A1* | 3/2013 | Winter | ..................... | B62M 3/00 |
| | | | | 280/246 |
| 2014/0008138 A1* | 1/2014 | Kim | ................... | B60L 11/1877 |
| | | | | 180/216 |
| 2017/0203811 A1* | 7/2017 | Germanovsky | ...... | B62K 27/003 |
| 2017/0225736 A1* | 8/2017 | Chen | ................... | B62K 11/007 |

* cited by examiner

HOVERBOARD BUDDY SYSTEM

CROSS-REFERENCE TO RELATED APPLICATIONS

This application claims the benefit of U.S. Provisional Application No. 62/331,971 entitled HOVERBOARD BUDDY SYSTEM and filed on May 4, 2016, and U.S. Provisional Application No. 62/465,152 entitled HOVERBOARD BUDDY SYSTEM and filed on Feb. 28, 2017, both of which are specifically incorporated by reference herein for all that they disclose and teach.

TECHNICAL FIELD

The invention relates generally to the field of personal conveyances; more particularly to the field of "hoverboards", and more particularly still, to a hoverboard buddy system.

BACKGROUND

There are many products designed to assist people in getting around: bicycles, motorcycles, mopeds, automobiles, scooters, etc. In recent years, a new product terms a "hoverboard" has been introduced. Although it doesn't actually hover, such boards provide a two-wheeled vehicle that can transport a person from place to place. The devices are unique because the two wheels aren't in a single longitudinal line (like in a bicycle), but are instead set apart from each each but in parallel, separate planes with the person standing between them. The devices have quickly become popular, especially with the younger, risk-taking crowd as although they are relatively stable, they do not provide the stability of say a three or four wheeled scooter, go-kart, etc.

Additionally, there are many people who are mobility impaired and need a walker, wheel-chair or some other form of assistance to get around. What is needed is a system that can incorporate within it a motorized hoverboard for mobility and add to that additional stability and/or ways of riding the hoverboard. Also, a hoverboard accessories system is needed that can be an all-around motorized utility device for moving people, wheel-chairs, walkers, dollies, golf club bag carts, wheelbarrows, and other types of people/item movers that are customizable and easily attached/detached to a hoverboard.

SUMMARY

The hoverboard buddy system comprises a number of components that can be attached together with a hoverboard in a number of different configurations in order to expand the riding options of the user. In one embodiment, components can include: a hoverboard, a saddle, additional wheels that can attach to the user or the saddle or other locations, a stability bar, a plurality of straight handles, a plurality of curved handles, a plurality of accessory wheels, a split seat that independently actuates either foot pedal on a hoverboard, a saddle seat with optional backrest, an extension frame with footrest and additional wheel(s), a plurality of drive handles, a plurality of attachment straps, and a set of independent rotation clamps that attach each drive handle to its own foot pedal on a hoverboard and allows the drive handles to actuate the foot pedals independently An additional embodiment of a hoverboard buddy system can include a fixed plate stand that attaches to a hoverboard and actuates both drive wheels simultaneously. In such a system, an extension bar can attach to the fixed plate and allow attachment of front and/or rear accessories such as a two-wheeled mover's dolly, a golf-club bag cart, etc. The independent wheel(s) on the front or rear accessory allow the user to turn the entire system by turning the accessory and effectively using the hoverboard as a fixed set of dual-driving wheels that act together to drive forward or reverse. Allowing the hoverboard drive wheels to be only partially fixed, even to the point of independence as when riding a bare hoverboard, may also prove advantageous in some instances.

The fixed plate stand can have a number of adjustment bars affixed to its undercarriage to provide a tight fit onto one or more styles of hoverboards. This is especially useful when multiple sizes of hoverboards are to be used. The adjustment bars can be removed or put in place with hook and loop materials, magnets, or any other suitable attachment means. Buffer shims can also be used in order to provide a higher friction attachment point between the fixed plate stand and the hoverboard (as well as to fill in the gaps that might otherwise exist between these two components of the system). Entrapment bumpers can also be employed that squeeze the hoverboard in place therebetween and ensure that the fixed plate stand stays in place on the hoverboard during use. Finally, cut-outs on the fixed plate stand and/or split seat can also be employed to allow the user a more direct contact with the hoverboard foot pedals, as needed.

Yet another embodiment of the system can include a rear accessory plate that has one or more independently rotatable caster-type wheel(s)—or similar suitable type of wheel(s). The rear accessory plate can attach to the main split seat that attaches to the hoverboard via loops that slide down over outer stanchions or inner stanchions. The rear accessory plate can be stood directly upon by a user/driver, or a seat can be attached thereto and a person can sit thereon. Upright handles can attach to the inner or outer stanchions and can then by moved forward or backward to move the split seat components that are each separately attached to one of the two foot pedals of the hoverboard. Actuating a hoverboard's foot pedal causes the wheel on that side of the hoverboard to rotate. The wheel drives forward if the foot pedal is tilted forward and rotates backwards if the foot pedal is tilted backwards.

In yet another embodiment employing a rear accessory plate, a front accessory plate can be attached in front of the main split seat to allow cargo, an extra chair/seat, etc. to be placed/mounted thereon. In this embodiment, extra racks can be added to hold the front and rear wheels of a wheelchair and someone who is confined to what was a formerly unpowered wheel chair can now use the motorized mobility functions of the hoverboard to propel themselves and their wheelchair with minimal physical effort on their part. This embodiment can also be used to carry a wheelbarrow or other types of carts/cargo-haulers. Additionally, a go-kart type configuration can be employed in this embodiment and a shell "car" can even be attached therearound to complete the go-kart appearance and function.

In another embodiment, a front accessory plate alone can be utilized and the user/drive simply stands on the main split seat. The front accessory plate can be adapted to hold another person, cargo, a walker (for the infirm or those needing more than just a cane to help them walk), or other device(s). In this embodiment, for example, a person who needs a walker can user the system to make them mobile and then remove their walker and use it as they normally would. A driver can use the main split seat to drive and steer this configuration, or a device attached out in front of the front accessory plate can have wheels that the user can actuate to control steering.

The above summary provides a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some initial concepts in a simplified form as a prelude to the more detailed description that is presented later.

BRIEF DESCRIPTION OF THE DRAWINGS

The aforementioned and other features and objects of the present invention and the manner of attaining them will become more apparent and the invention itself will be best understood by reference to the following descriptions of a preferred embodiment and other embodiments taken in conjunction with the accompanying drawings, wherein.

DETAILED DESCRIPTION

Figure 1:
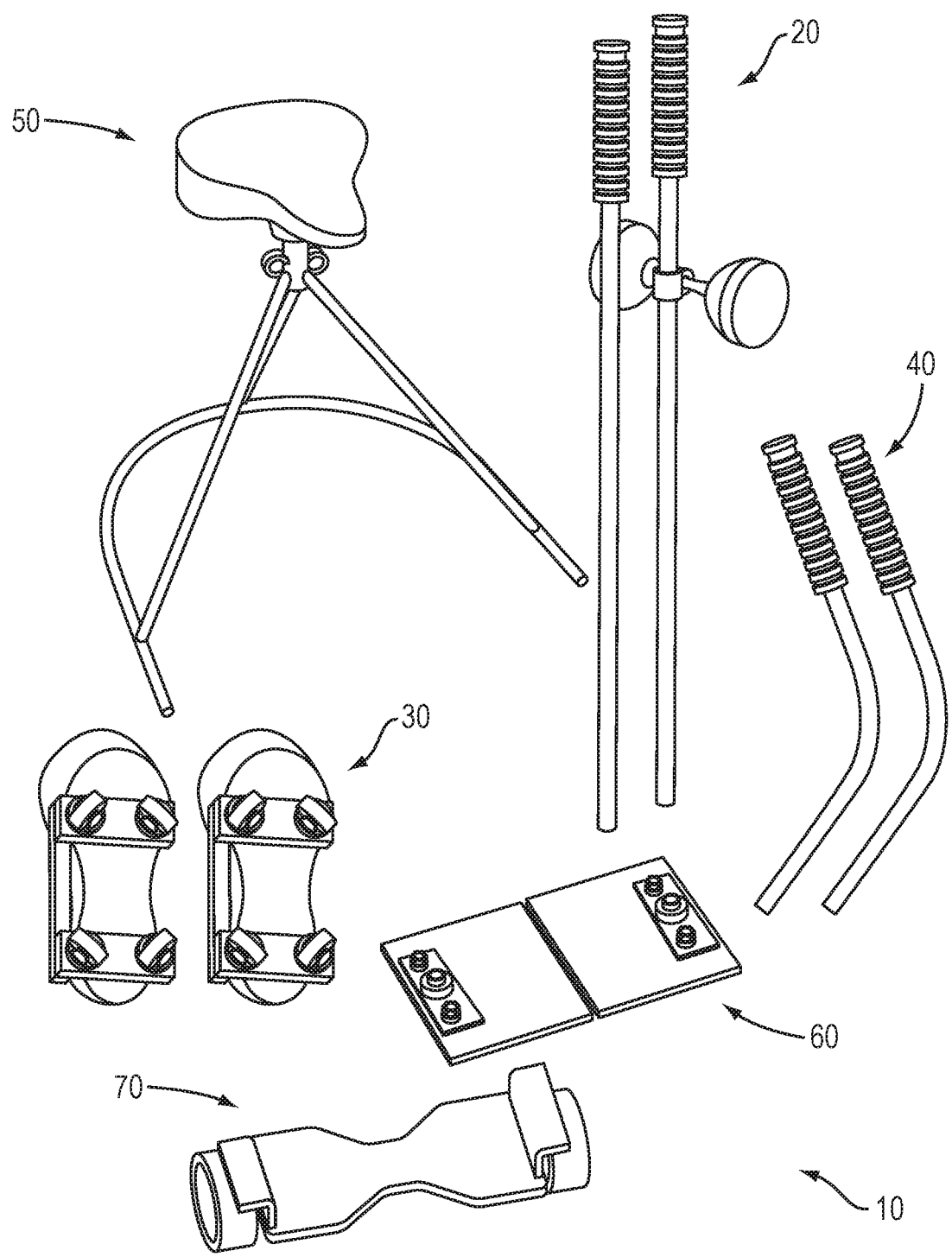
FIG. 1 illustrates a perspective view of an exemplary embodiment of a hoverboard buddy system.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples. Similarly, in this disclosure, language such as "could, should, may, might, must, have to, can, would, need to, is, is not", etc. and all such similar language shall be considered interchangeable whenever possible such that the scope of the invention is not unduly limited. For example, a comment such as: "item X is used" can be interpreted to read "item X can be used".

Exemplary embodiments are described below in the accompanying Figures. The following detailed description provides a review of the drawing Figures in order to provide an understanding of, and an enabling description for, these embodiments. One having ordinary skill in the art will understand that in some cases well-known structures and functions have not been shown or described in detail to avoid unnecessarily obscuring the description of the embodiments. Further, examples described herein are intended to aid in understanding the principles of the embodiments, and are to be construed as being without limitation to such specifically recited examples and conditions. As a result, the inventive concepts are not limited to the specific embodiments or examples.

Referring now to the drawings, FIG. 1 illustrates a perspective view of an exemplary embodiment of a hoverboard buddy system 10 comprising: a hoverboard 70, a saddle with additional wheels and a stability bar 50, a plurality of straight handles 20, a plurality of curved handles 40, a plurality of accessory wheels 30, and a split seat 60 that independently actuates either foot pedal on a hoverboard 70.

The split seat 60 rests on the hoverboard's foot pedals and provides attachment means between the hoverboard and the other components. The under side of the split seats 60 each have a raised section that is close to the same shape and size of the rubber shaped areas that a person stands on to activate the hidden switches that run the hoverboard motors. When pressure is applied to the split seats in place over these sensors, the motors will always activate regardless of whether you're directly over the switches or not. This works particularly well when sitting directly on the split seats, with attachments on the outer edge pins, or middle edge pins for one hand operation. An added unexpected advantage to the split seats, was that lighter riders sometimes experience an uncontrollable vibration/chatter of the hoverboard because switches are not fully activated. The split seats activate the switches more evenly, resulting in a smoother ride.

Figure 2:
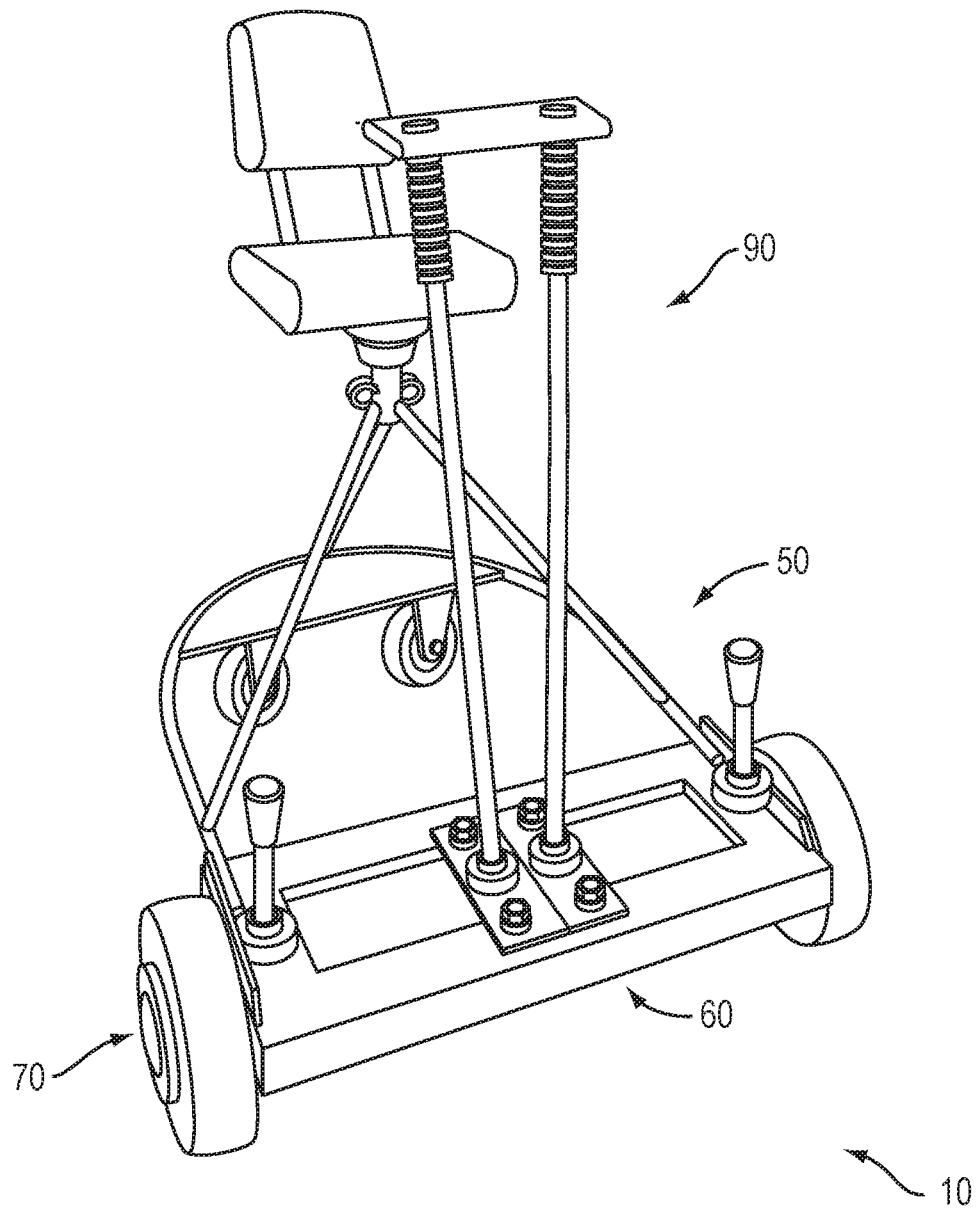
FIG. 2 illustrates a perspective view of another exemplary embodiment of a hoverboard buddy system with a one-handed operational handle in place.

FIG. 2 illustrates a perspective view of another exemplary embodiment of a hoverboard buddy system 10 with a one-handed operational handle 90 in place. Two removable pins placed close to the center edge of each split seat allow an extended handle to slide in place over each pin. The tops of the handles are connected with a horizontal handle that separates the vertical handles several inches. The handle is loosely fitted to the vertical handles. It is this separation that enables the motors to oppose each other when twisting the horizontal handle in either direction, thus turning the hoverboard. The split seat center mounted pins can be removed in seconds, making it ready for the low sit down operation.

This embodiment highlights the enhanced user base that the system can support as people with limited mobility and/or handicaps may be able to use the system in various configurations. The one-handed steering and driving mechanism described above would allow a person with only one hand to safely operate the system. Additionally, people could use their other hand for holding groceries, etc. and still operate the system safely. A small red tip on the end of a threaded rod can comprise a foot switch. A rounded ¼ circle shape that is attached to one end of the strap hinge and slides through the opposite end of the other half of the strap hinge that is fastened to the left split seat. The red tip makes contact with the hoverboard's small spring loaded button when pressure is applied with the heel of you foot, thus turning the hoverboard on or off with the user's foot.

Figure 3:
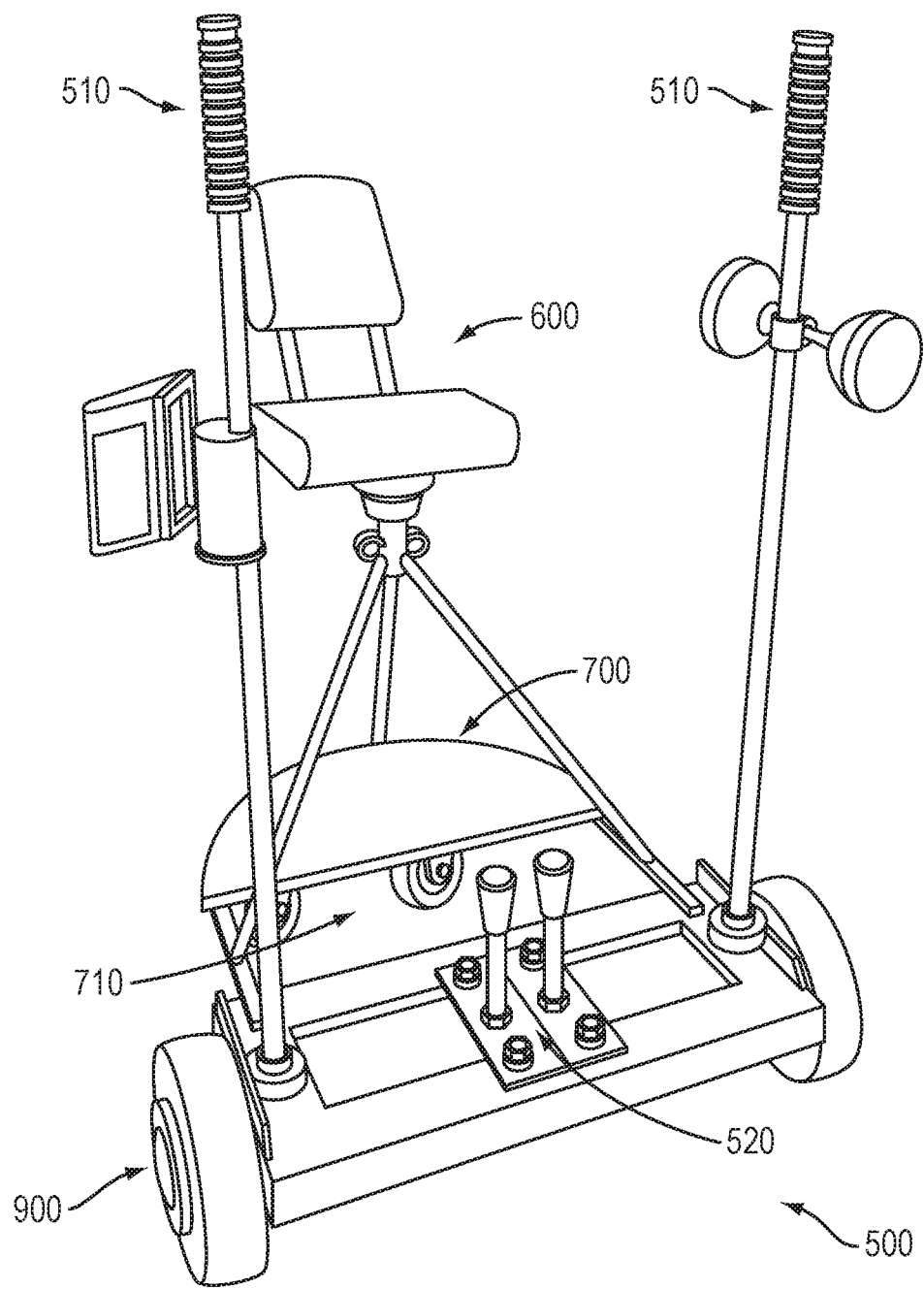
FIG. 3 illustrates a perspective view of an exemplary embodiment of a hoverboard buddy system with a rear accessory plate, tripod seat, drive handles, and main split seat.

FIG. 3 illustrates a perspective view of an exemplary embodiment of a hoverboard buddy system with a rear accessory plate 700, wheels 710, tripod seat 600, drive handles 510, inner stanchions 520, hoverboard 900 and main split seat 500.

Figure 4:
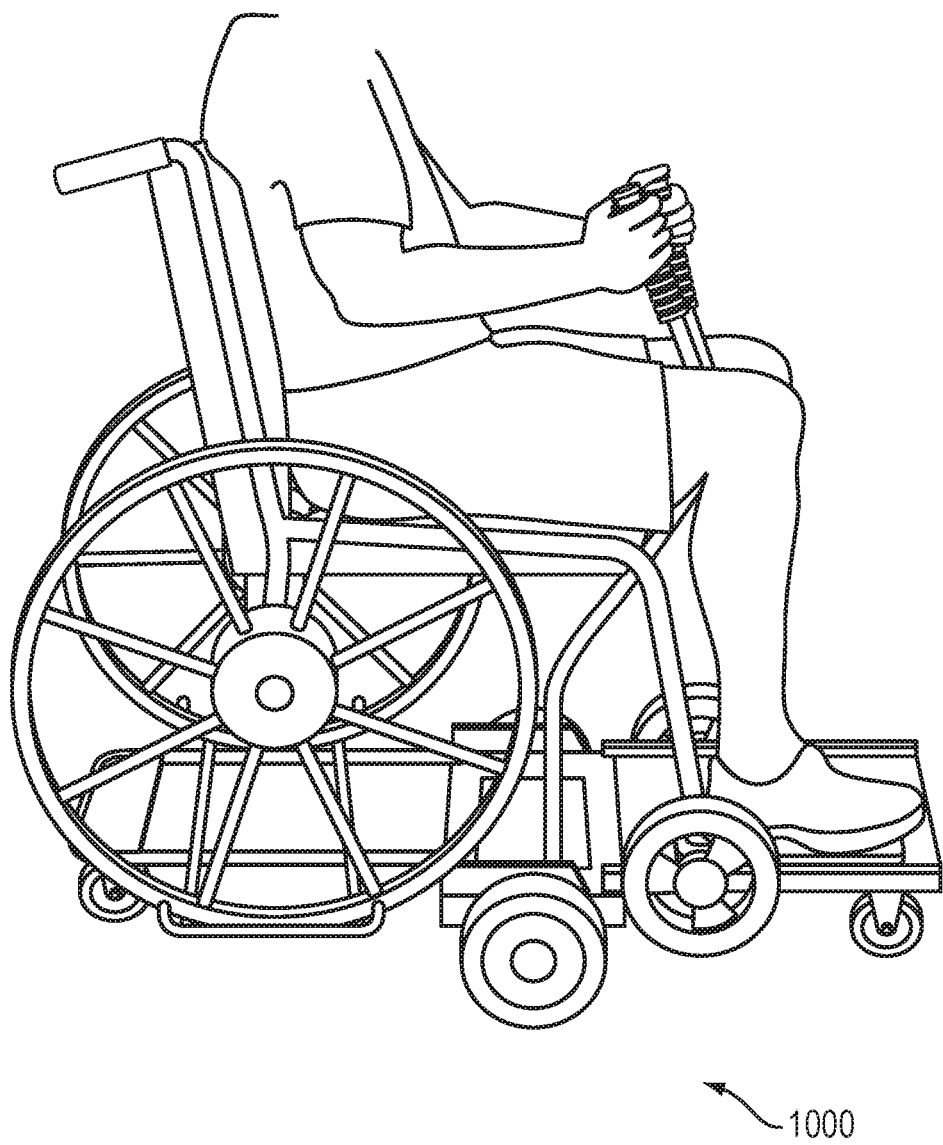
FIG. 4 illustrates a perspective view of another exemplary embodiment of a hoverboard buddy system with front and rear accessory plates in place with a person riding in a seated position in their wheel chair carried on the system.

FIG. 4 illustrates a perspective view of another exemplary embodiment of a hoverboard buddy system with front and rear accessory plates in place with a person riding in a seated position in their wheel chair carried on the system. In this embodiment, special brackets are fitted onto the front and rear accessory plates to securely hold the wheels of the wheelchair Then upright handles are attached to the stanchions to allow the driver to actuate the main split seat and drive the system.

Figure 5:
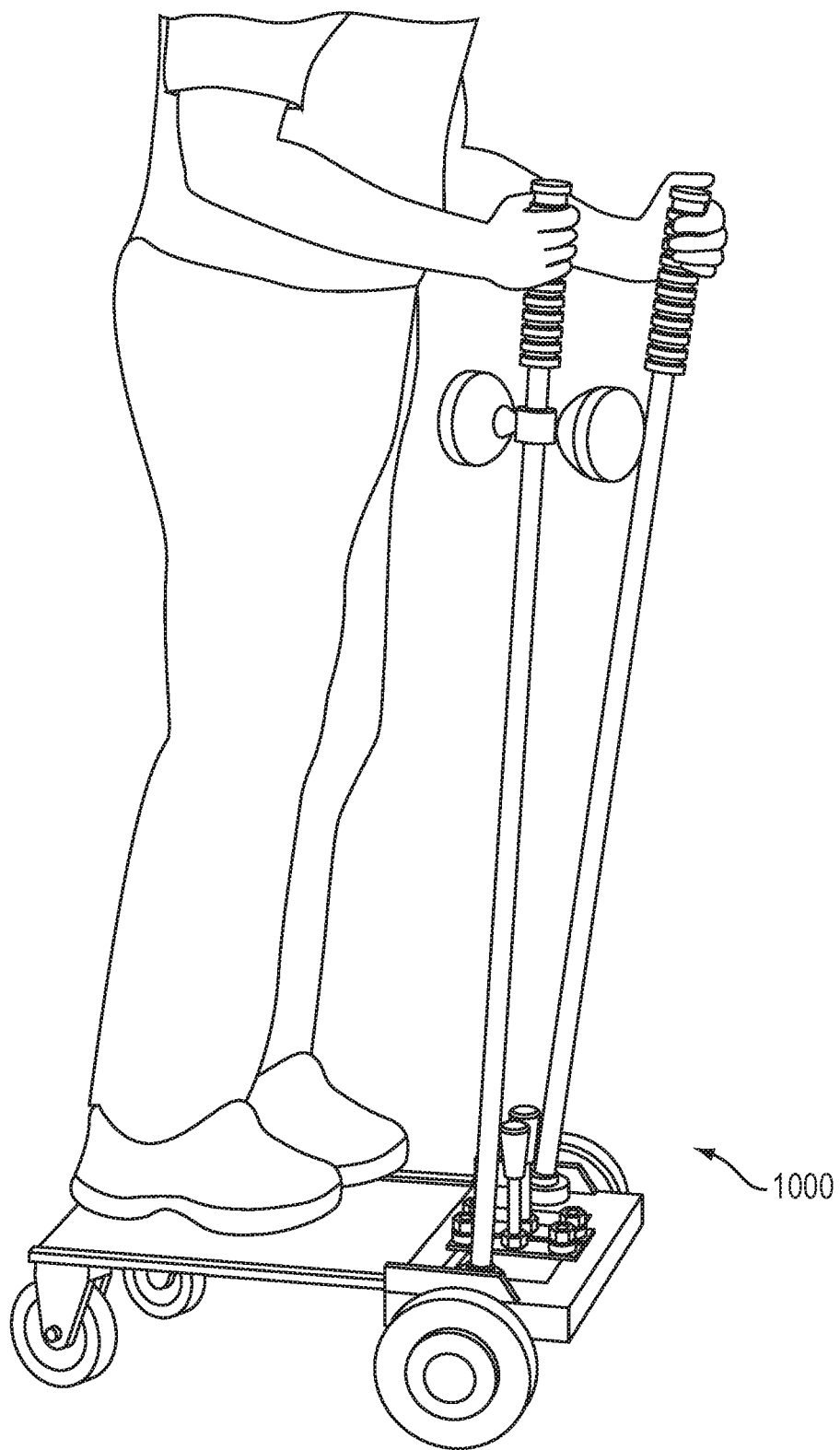
FIG. 5 illustrates a perspective view of an additional exemplary embodiment of a hoverboard buddy system with a rear accessory plate, wherein the driver stands upright on this plate and uses drive handles to control the system.

FIG. 5 illustrates a perspective view of an additional exemplary embodiment of a hoverboard buddy system 1000 with a rear accessory plate, wherein the driver stands upright on this plate and uses drive handles to control the system.

Figure 6:
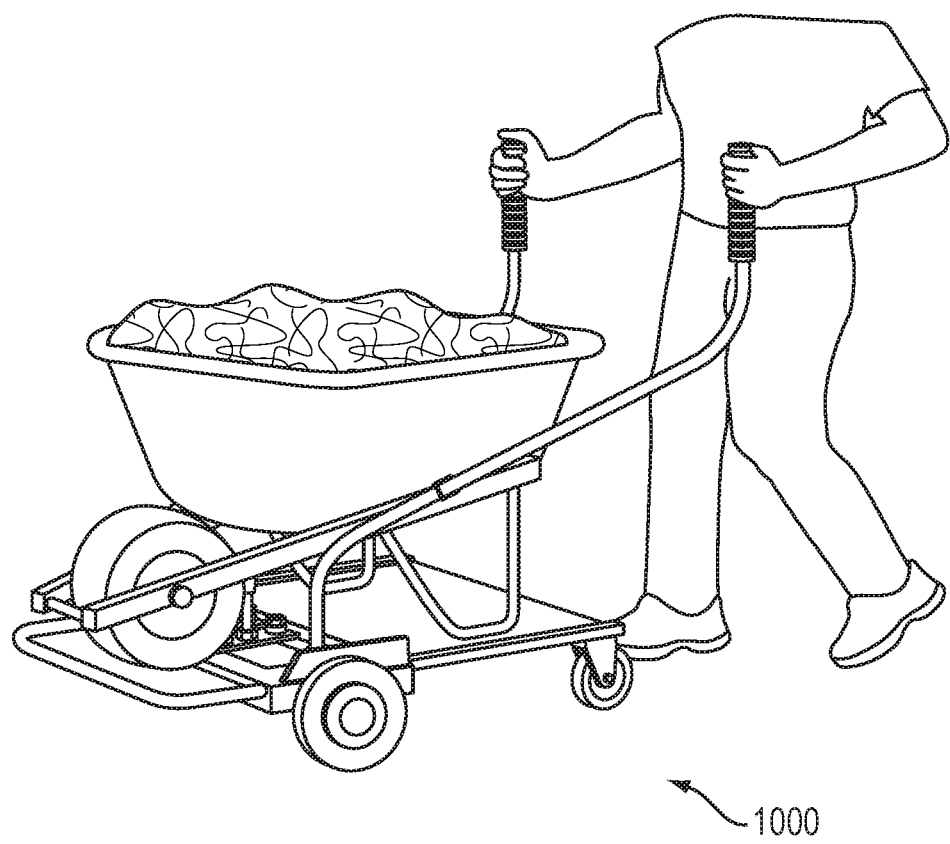
FIG. 6 illustrates a perspective view of another exemplary embodiment of a hoverboard buddy system with front and rear accessory plates in place with a wheelbarrow riding on the system and the driver walking behind.

FIG. 6 illustrates a perspective view of another exemplary embodiment of a hoverboard buddy system 1000 with front and rear accessory plates in place with a wheelbarrow riding on the system and the driver walking behind. In this embodiment, a special long set of drive handles are used. When the driver gets the wheelbarrow to the dump site, he can rotate the handles out of the way and dump the wheelbarrow.

Figure 7:
FIG. 7 illustrates a perspective view of another exemplary embodiment of a hoverboard buddy system with a fixed seat plate and a pusher extension bar pushing a golf bag cart.

FIG. 7 illustrates a perspective view of another exemplary embodiment of a hoverboard buddy system 1000 with a fixed seat plate and a pusher extension bar pushing a golf bag cart.

Figure 8:
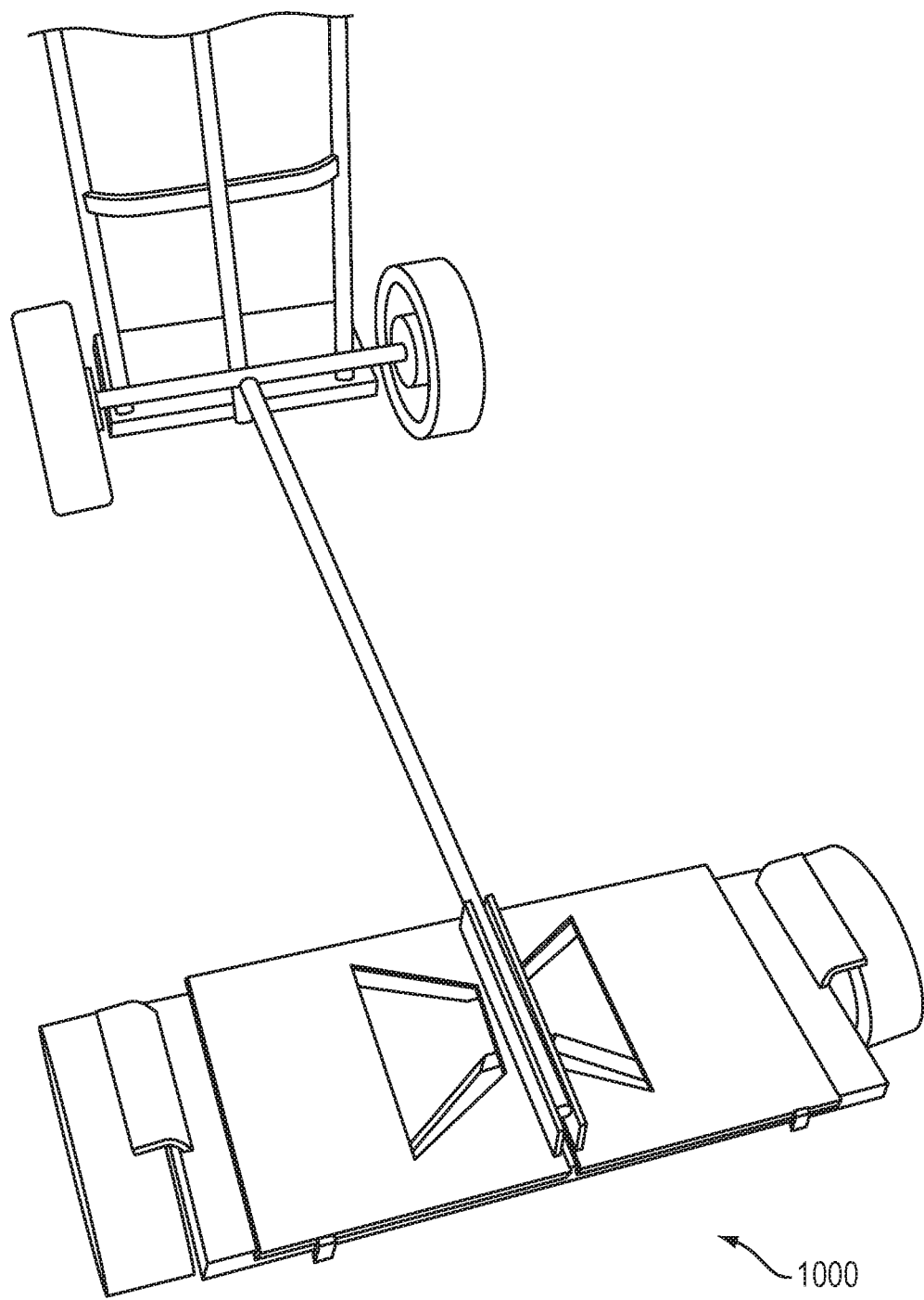
FIG. 8 illustrates a perspective view of another exemplary embodiment of a hoverboard buddy system with a fixed seat plate and a pusher extension bar for attaching to a mover's dolly.

FIG. 8 illustrates a perspective view of another exemplary embodiment of a hoverboard buddy system 1000 with a fixed seat plate and a pusher extension bar for attaching to a mover's dolly.

While particular embodiments have been described and disclosed in the present application, it is clear that any number of permutations, modifications, or embodiments may be made without departing from the spirit and the scope of this disclosure. Particular terminology used when describing certain features or aspects of the embodiments should not be taken to imply that the terminology is being redefined herein to be restricted to any specific characteristics, features, or aspects with which that terminology is associated. In general, the application should not be construed to be limited to the specific embodiments disclosed in the specification, unless the above Detailed Description section explicitly defines such terms. Accordingly, the actual scope of the inventions encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of embodiments can be modified, if necessary, to employ the systems, functions, and concepts of the various references to provide yet further embodiments.

In light of the above "Detailed Description," the Inventors may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventor. As discussed herein, specific terminology used when describing certain features or aspects should not be taken to imply that the terminology is being redefined herein to be restricted to any specific characteristics, features, or aspects of the embodiments with which that terminology is associated.

The above specification, examples and data provide a description of the structure and use of exemplary implementations of the described systems, articles of manufacture and methods. It is important to note that many implementations can be made without departing from the spirit and scope of the disclosure.

I claim:

1. A hoverboard buddy system, the system comprising:
an accessory configured to be attached to a hoverboard, wherein the accessory includes a plurality of accessory wheels; and
a split seat operably connected to the accessory and the split seat configured to be operably connected to each foot pedal on a hoverboard, wherein the split seat includes two portions that each include at least two vertical pins that are each configured to receive a removable handle that independently actuates a foot pedal on the hoverboard upon activation by a user.

2. The hoverboard buddy system of claim 1 further comprising two vertical handles, wherein each of the two vertical handles are removably connected to a pin of the at least two pins.

3. The hoverboard buddy system of claim 2 wherein the two handles are joined together by a horizontal handle to permit one hand operation of the hoverboard.

4. The hoverboard buddy system of claim 2 wherein the at least two pins are positioned at opposite ends of the split seat and the handles are separated when connected to the pins to permit two hand operation of the hoverboard.

5. The hoverboard buddy system of claim 1 wherein the split seat includes a first portion in operable connectivity with a first foot pedal of the hoverboard and a second portion separated from the first portion and in operable connectivity with a second foot pedal of the hoverboard.

6. The hoverboard buddy system of claim 1 wherein the accessory is a wheelchair.

7. The hoverboard buddy system of claim 1 wherein the accessory is a dolly.

8. The hoverboard buddy system of claim 7 further comprising:
a fixed plate stand operably connected to the split seat, and
a pusher extension bar extending from the fixed plate stand and connected to the dolly.

9. The hoverboard buddy system of claim 1 wherein the accessory is a golf club cart.

10. The hoverboard buddy system of claim 1 wherein the accessory is a saddle.

11. The hoverboard buddy system of claim 10 further comprising a stability bar and a plurality of curved handles.

12. The hoverboard buddy system of claim 1 wherein the accessory is a wheel barrow.

13. The hoverboard buddy system of claim 1 wherein the accessory is positioned behind the hoverboard when attached to the hoverboard.

14. The hoverboard buddy system of claim 1 wherein the accessory is positioned in front of the overboard when attached to the hoverboard.

\* \* \* \* \*